(No Model.)

L. P. HEWITT & S. W. BUENCE.
TIRE TIGHTENER.

No. 446,869. Patented Feb. 24, 1891.

Witnesses

Inventors,
L. P. Hewitt.
S. W. Buence.
By their Attorneys,
Higdon & Higdon

UNITED STATES PATENT OFFICE.

LANSING P. HEWITT AND SAMUEL W. BUENCE, OF TURNER, KANSAS.

TIRE-TIGHTENER.

SPECIFICATION forming part of Letters Patent No. 446,869, dated February 24, 1891.

Application filed September 1, 1890. Serial No. 363,660. (No model.)

*To all whom it may concern:*

Be it known that we, LANSING P. HEWITT and SAMUEL W. BUENCE, of Turner, Wyandotte county, Kansas, have invented certain new and useful Improvements in Tire-Tighteners, of which the following is a full, clear, and exact description, reference being had to the accompanying drawings, forming a part hereof.

Our invention relates to improvements in tire-tighteners; and it consists in the peculiar combination and arrangement of devices, as will be more fully specified hereinafter, and particularly pointed out in the claim.

Our object is to provide a means whereby when the tire becomes loose it may be tightened by the expansion of the felly. We accomplish this result by the application of the devices illustrated in the accompanying drawings.

Figure 1:
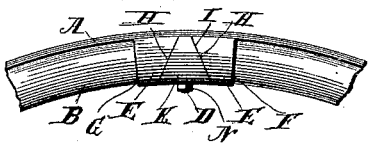
Figure 2:
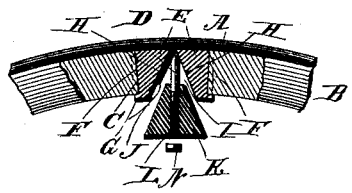
Figure 3:
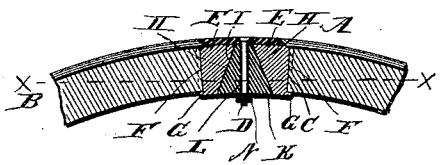
Figure 4:
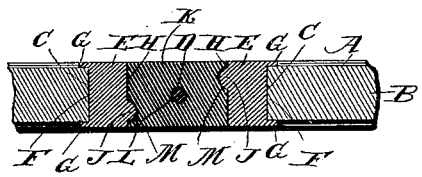
Figure 5:
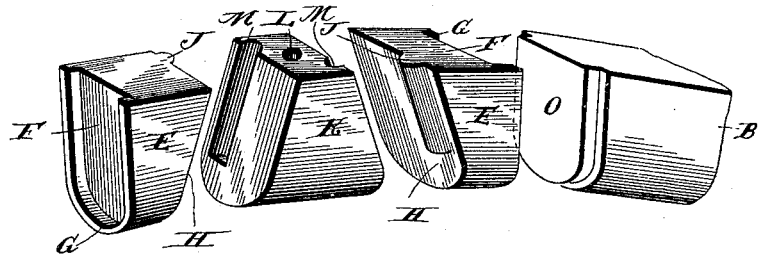

Figure 1 is a side elevation of our invention applied to the tire and felly. Figs. 2 and 3 are longitudinal vertical sections of the tire and felly, illustrating the step necessary in applying our invention for tightening the tire. Fig. 4 is a horizontal sectional view on line *x x* of Fig. 3. Fig. 5 is a perspective view of the parts of our invention detached and in position to be applied to the wheel, showing, also, the end of the felly reduced.

Similar letters refer to similar parts in all the figures, in which A represents the tire of a wheel having the felly B therein cut away at C, and the detached part described. A bolt D, the head thereof being countersunk in the periphery of the tire, projects rearwardly a slight distance beyond the inner side of the felly, similar castings E E conforming to the general contour of the felly, but of larger size, and provided with the recessed outer ends F, forming the flange G, which incloses the severed ends of the felly when placed in position, extending around the inner curved and opposite side thereof. The inner inclined opposite sides H H of the castings form the wedge-shaped recess I between them, each opposite side H having the extended and similar lugs J thereon, which are semicircular in cross-section and diagonally opposite each other.

K represents the wedge-shaped casting provided with the radial passage L, through which the bolt D projects, and the similar extended recess M, semicircular in cross-section, on the opposite inclined sides of the casting and situated diagonally opposite each other, which recesses when the casting is slipped on the bolt engage the lugs J of castings H, and thus when forced home preventing any possibility of lateral movement. The wedge-shaped casting K, being larger than the wedge recess I between the castings E, naturally when forced home expands the felly and the tire is tightened. The projecting end of the bolt is then engaged by the nut N, which prevents any accidental displacement of the device, as will be readily understood.

The castings may be made of any size, or when the felly is too large we may reduce the ends to form shoulders O, adapted to enter the recess on the outer ends of the castings E, and there be firmly secured by the insertion of the wedge-casting K, as will be readily understood.

Having thus described our invention, what we claim as new, and desire to secure by Letters Patent, is—

In a tire-tightener, the blocks E, of substantially the contour of the felly, recesses in the outer ends of the blocks which are adapted to receive the ends of the felly, projections on the inclined inner ends of the blocks, so located as to be out of alignment with each other, a central block of wedge shape adapted to enter the opening between the blocks E and to force the same apart, grooves in the faces of the central block next adjacent to the side blocks and adapted to register with the projections on said blocks, and a central aperture in the wedge-shaped block to receive a bolt passing through the same and through the tire, whereby the wedge is forced into position, substantially as described.

In testimony whereof we affix our signatures in presence of two witnesses.

LANSING P. HEWITT.
    SAML. W. BUENCE.

Witnesses:
 G. Y. THORPE,
 H. E. PRICE.